March 2, 1965 R. P. MAZZAGATTI 3,172,078
ACOUSTIC VELOCITY WELL LOGGING INSTRUMENT
Filed Jan. 27, 1959
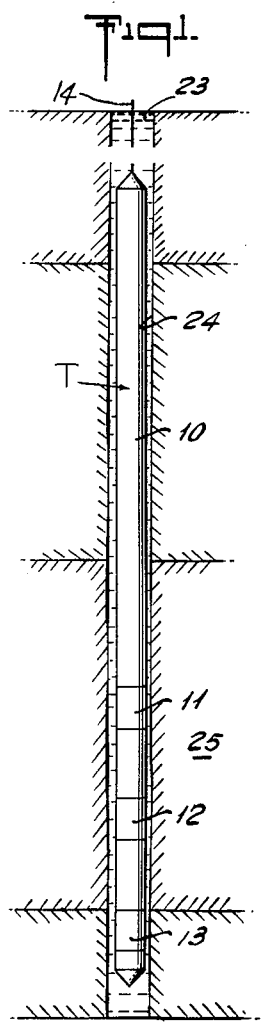
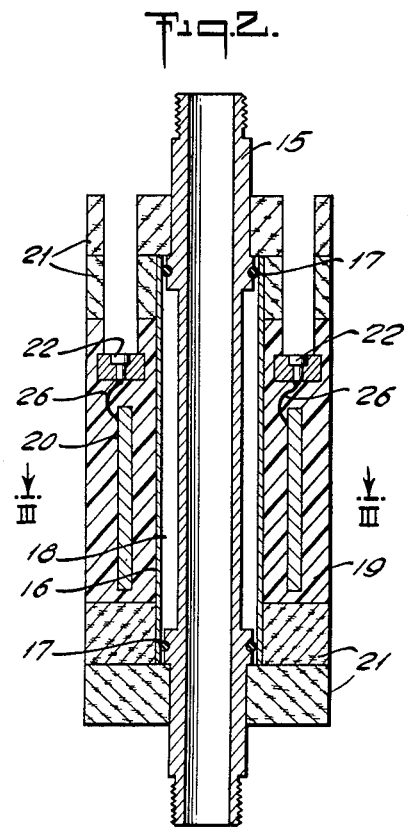
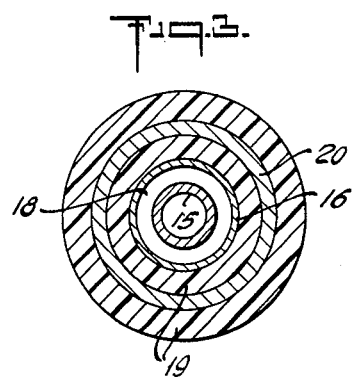

3,172,078
ACOUSTIC VELOCITY WELL LOGGING
INSTRUMENT
Roy P. Mazzagatti, Bellaire, Tex., assignor to Texaco Inc., a corporation of Delaware
Filed Jan. 27, 1959, Ser. No. 789,293
7 Claims. (Cl. 340—17)

This invention relates to an acoustic velocity well logging instrument, and more particularly to a novel electro-mechanical transducer assembly for converting electrical energy into acoustic energy, and vice versa. It also relates to a method for making such a transducer.

It has been proposed to survey earth bores by generating acoustic waves and measuring the velocity of sound propagated through the surrounding earth strata to determine the acoustic properties of the strata. Reference is made to U.S. Patents 2,704,364 and 2,722,282 for further information.

In this type of logging apparatus electrical energy is converted into acoustic energy by means of a transmitting transducer, and vice vera by one or more receiving transducers, each of which comprises an acoustic transducer element such as a piezo electric or electrostrictive element capable of effecting the conversion. Two electrostrictive materials which have been used successfully are barium titanate and lead zirconium titanate.

For successful operation it is essential that the piezo electrical or electrostrictive element be mounted firmly in such a way as to resist breakage. It is particularly essential that the elements retain their positions firmly even at the high temperatures encountered within bore holes drilled hundreds of feet into the earth. Additionally, it is necessary that the elements be so mounted as to provide a high degree of acoustic coupling to the adjacent earth formations being surveyed.

We have solved the problems outlined above in a substantial degree by constructing each transducer element with an electrostrictive element firmly embedded within a solid matrix of a cured epoxy resin which has a thermal coefficient of expansion sufficiently close to that of the element to avoid fracturing the element, either during casting of the transducer or during its subsequent use in a well logging operation. Such resin also has excellent retention of its physical and electrical properties up to about 300° F. A particularly useful matrix is one cast from a liquid epoxy resin having a molecular weight between 420 and 580 which is cured with an amine type curing agent such as metaphenylenediamine. In order to assure the similarity of thermal coefficients of expansion it is often advantageous to include in the cured epoxy resin a quantity of uniformly distributed fine particles of a filler material such as alumina in an amount between 67 and 300 parts by weight per 100 parts by weight of the liquid epoxy resin.

The polymerized epoxy resin matrix is prepared from a glycidyl polyether obtainable, as is well known, from reaction of epichlorhydrin and polyhydric phenols or alcohols in an alkaline medium. There is preferably used the glycidyl polyether of a polyhydric phenol, including pyrogallol and phloroglucinol, but particularly of a dihydric phenol. Such polyethers are obtained by heating the dihydric phenol with epichlorhydrin at about 50° C. to 150° C. using 1 to 2 or more mols of epichlorhydrin per mol of dihydric phenol. Also present is a base, such as sodium or potassium hydroxide in slight stoichiometric excess to the epichlorhydrin, i.e., about 2 percent to 30 percent. The heating is continued for several hours to effect the reaction and the product is then washed free of salt and base. The product, instead of being a simple compound, is generally a complex mixture of glycidyl polyethers, but the principal product may be represented by the formula:

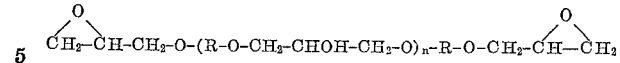

wherein $n$ is an integer of the series 0, 1, 2, 3 . . . preferably 0 to 10, and R represents the divalent hydrocarbon radical of the dihydric phenol. Although the polyether is a substance primarily of the above formula, it may contain some material with one or both of the terminal glycidyl radicals in hydrated form. For a more complete description of epoxy resins reference may be had to U.S. Patent No. 2,642,412.

These resins are additionally described in detail in the Encyclopedia of Chemical Technology, by Kirk-Othmer, first supplement volume, pages 312 to 329, published by the Inter-Science Encyclopedia Inc.

The invention will be described more in detail below with reference to the accompanying drawings wherein:

FIG. 1 is a schematic side elevational view of an acoustic well logging sonde in a bore hole;

FIG. 2 is a vertical section view on an enlarged scale of one of the transducer assemblies of the sonde shown in FIG. 1; and FIG. 3 is a cross-sectional view taken along the line III—III in FIG. 2.

Referring to FIG. 1, there is illustrated an acoustic velocity logging tool T disposed in fluid 23 contained in a bore hole 24 adjacent to subsurface formation 25. The tool comprises an electronic section 10, a transmitting transducer assembly 11, and receiving transducer assemblies 12 and 13. The section 10 may include receiver amplifiers and a generator for supplying electric pulses to the transmitting transducer 11. A cable 14 supports the tool within the bore hole, and transfers electrical energy between the tool and equipment located at the earth's surface.

FIG. 2 shows details of an electro-mechanical transducer assembly which may be used in the tool, for either transmitting or receiving acoustic pulses. This assembly comprises a support member 15 and a tubular metal sleeve 16 disposed concentrically around the support member 15 and spaced therefrom by resilient spacing members 17 located near each end of sleeve 16. The support member 15, the sleeve 16 and the spacing members 17 cooperate to entrap an air space 18 between the support member and sleeve. The transducer itself comprises a hollow cylindrical casting 19 of cured thermoset epoxy resin mounted on the metal sleeve 16, and having a hollow cylindrical piezo electric element 20 embedded concentrically within the casting 19. Two thrust washers 21 of the type marketed under the trademark Corprene are disposed around the support member 15 at each end of the casting 19. Terminals 22 and lead-in wires 26 provide for electrical connection to the element 20.

When preparing our novel transducer a warm (e.g. 158° F.) mixture of the necessary quantities of liquid epoxy resin and amine curing agent, with or without solid filler material, is inserted in a warm (e.g. 158° F.) mold of the correct size and the piezo electric element is emmersed therein. Curing is then accomplished by placing the mold in a pressure vessel and allowing the casting in the mold to stand at room temperature and a superatmospheric pressure of nitrogen gas, such as 100 pounds per square inch gauge, for a long period of time, such as 12 hours. Then the casting in the mold is heated up to a much higher temperature, such as 180° F., while maintaining superatmospheric pressure, and is held at this temperature and pressure for several hours, for example 3 hours. Then the casting is removed from the mold and post cured in an oil bath at a still higher temperature, such as 285° F., for a short period of time, such as 1 hour.

When barium titanate is the piezo electric element it becomes depolarized during the casting process as the result of heating beyond the curie point. Therefore, repolarization is accomplished by applying a polarizng voltage gradient of approximately 24,000 volts per inch to the element while the post cured acoustic element is heated in an oil bath at 212–270° F. (above the curie temperature). After about one hour the element is allowed to cool by decreasing the oil bath temperature to 110° F. in 4 hours at which time the 3000 volts voltage is removed. This voltage-temperature relation imposes severe electrical insulation requirements on the resin matrix, but the cured epoxy resin meets these requirements successfully.

When the piezo electric element is lead zirconium titanate repolarization is not necessary because the element remains polarized at the temperature of molding.

*Example 1*

67 parts by weight of alumina of a size to pass through a 120 mesh sieve and to be retained upon a 140 mesh sieve U.S. Standard, were mixed with 100 parts by weight of a liquid epoxy resin (heated to 158° F.) having a viscosity of approximately 165 poises at 25° C., having a molecular weight of approximately 515, and having an epoxide equivalent of approximately 195 grams of resin containing 1 gram-equivalent of epoxide. The epoxy resin had the chemical structure

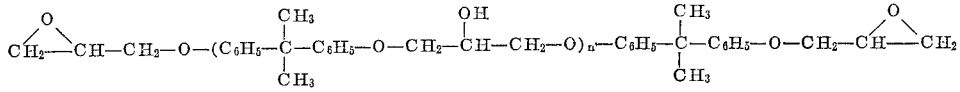

14 parts by weight of metaphenylenediamine curing agent were then added and the mixture was introduced into a cylindrical mold (heated to 158° F.) containing a barium titanate cylinder having a ⅛ inch wall. The casting was then cured under heat and pressure as described above and subsequently the element was repolarized at 270° F. by applying 3000 volts thereto. A perfect transducer resulted which was repeatedly heated to 270° F. without mechanical failure.

A second transducer casting prepared in the same way resulted in a fracture of the epoxy casting, so it was concluded that more completely succesful results would be obtained by increasing the quantity of alumina in the resin, as in Example 2, below.

*Example 2*

A mixture of 100 parts by weight of the same epoxy resin described in Example 1, 250 parts of alumina and 14 parts of metaphenylene diamine curing agent were cast into a mold containing a barium titanate cylinder having a ⅛ inch wall and cured under temperature and pressure as described hereinabove, the curing temperature being 180° F. and the postcuring temperature being 285° F.

The postcured element was then heated in an oil bath to 230° F. while applying a polarization voltage of 3000 volts. After one hour the oil bath temperature was decreased to 110° F. in 4 hours and the voltage removed. The element was then tested and found satisfactory.

Many other transducers of this composition have been made without cracking of the epoxy casting around the element.

The transducer elements of Examples 1 and 2 were placed in acoustic well logging instruments and successfully used for logging seismic shot holes.

Obviously, many modifications and variations of the invention, as hereinbefore set forth, may be made without departing from the spirit and scope thereof, and therefore only such limitations should be imposed as are indicated in the appended claims.

I claim:

1. A transducer assembly for an acoustic velocity well logging instrument comprising an acoustic transducer element of the piezoelectric type embedded within a cured epoxy resin matrix, said matrix further including a finely divided solid filler material having a thermal coefficient of expansion relatively close to that of said element, said filler material being present in significant quantities in order to prevent fracture of said assembly due to temperature changes.

2. A transducer in accordance with claim 1 wherein said element is barium titanate.

3. A transducer in accordance with claim 1 wherein said element is lead zirconium titanate.

4. A transducer in accordance with claim 1 wherein said element has the shape of a tubular cylinder.

5. A transducer in accordance with claim 1 wherein said filler material is alumina.

6. A transducer in accordance with claim 5 wherein said alumina is present in an amount between 67 and 300 parts by weight per 100 parts of epoxy resin.

7. A transducer assembly having an acoustic velocity well logging instrument comprising an acoustic transducer element of the piezo-electric type formed essentially of barium titanate, a cured epoxy resin, said transducer element being completely imbedded within said cured epoxy resin matrix, a finely divided solid filler material formed essentially of alumina, said filler material being substantially uniformly distributed throughout said matrix in sufficient quantities to provide a thermal coefficient of expansion relatively close to that of said element in order to prevent fracturing of said element due to temperature changes.

References Cited in the file of this patent
UNITED STATES PATENTS

| | | |
|---|---|---|
| 2,425,843 | Snavely | Jan. 25, 1945 |
| 2,427,348 | Bond et al. | Sept. 16, 1947 |
| 2,683,921 | Goss | July 20, 1954 |
| 2,735,829 | Wiles | Feb. 21, 1956 |
| 2,749,532 | Harris | June 5, 1956 |
| 2,788,454 | Zapponi | Apr. 9, 1957 |
| 2,846,599 | McAdam | Aug. 5, 1958 |
| 2,966,704 | O'Brian | Jan. 3, 1961 |
| 2,972,068 | Howry et al. | Feb. 14, 1961 |
| 3,027,540 | Howatt | Mar. 27, 1962 |